Nov. 14, 1950  E. C. VAN BUSKIRK ET AL  2,530,099
ADHESIVE COMPOSITION AND STRUCTURE EMBODYING SAME
Filed April 12, 1949
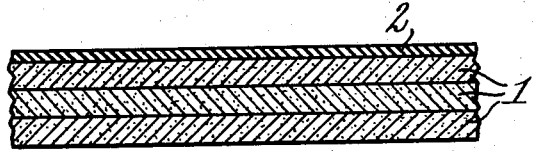
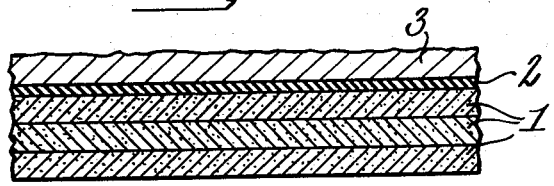
INVENTORS
EDWARD C. VAN BUSKIRK
DAVID D.M. STREED
JAMES H. FLOOD
BY
Robert J. Patterson
ATTORNEY Patented Nov. 14, 1950

2,530,099

UNITED STATES PATENT OFFICE 2,530,099

ADHESIVE COMPOSITION AND STRUCTURE EMBODYING SAME

Edward C. Van Buskirk and David D. M. Streed, South Bend, and James H. Flood, Mishawaka, Ind., assignors to United States Rubber Company, New York, N. Y., a corporation of New Jersey Application April 12, 1949, Serial No. 87,032

15 Claims. (Cl. 154—53.5)

This invention relates to an adhesive composition and more particularly to an adhesive composition which is particularly adapted to use for adhering polyester resin laminates to surfaces to be covered therewith. Still more particularly the invention relates to the combination of a polyester resin laminate with the new adhesive composition described herein.

In one of its aspects, the present invention relates to a new pressure-sensitive adhesive composition.

Our invention is based upon our discovery of a unique adhesive which can be applied to the back of a sheet of material, this adhesive dried on the material and the coating activated at any future time at which it is desired to adhere this adhesive-backed material to the surface to be covered. Our adhesive can be activated indefinitely and it may be activated either with heat or solvent. Furthermore, our adhesive can be used to adhere porous and non-porous materials to one another. Our adhesive can, if desired, be used as an organic solder which upon heating produces an excellent bond between surfaces such as between metal and some other non-porous surface.

There has long been a need for an adhesive which could be successfully used for adhering so-called low-pressure laminate material, i. e., a polyester resin laminate formed of laminations of fibrous material such as cloth or paper impregnated and bonded together with the resinous polymerization product of a mixture of a compound having a single terminal ethylenic group $CH_2=C<$ with an unsaturated alkyd resin which is the reaction product of an ethylenic-alpha-beta dicarboxylic acid with a glycol, to surfaces to be covered therewith. There has been felt a particular need for an adhesive which could be applied to the back of such a laminate at the time of manufacture thereof, dried and stored in a non-tacky condition until the laminate was ready to be adhered to a surface, at which time the surface of the adhesive could be activated either with a solvent for the adhesive base or with heat after which the adhesive-backed material could then be adhered to the surface to be covered therewith.

Previously, there has been no completely successful adhesive for adhering the above-mentioned type of relatively rigid laminate to horizontal and vertical surfaces. In general, the types of adhesives heretofore proposed fall into the following general classes:

(a) Thermosetting resin type.
(b) Thermoplastic resin type (e. g., adhesives based on vinyl chloride-vinyl acetate copolymers).
(c) Elastomer-based adhesive of the curing type.
(d) Asphaltic type (linoleum cement).

The use of the thermosetting resin adhesives now on the market requires application either of heat and mechanical pressure or of mechanical pressure alone, neither of which can be used successfully in the case of field installations. Although the thermosetting resin adhesives produce a firm bond, they do not have enough initial tack to support the weight of a standard size, low-pressure laminate panel, and further the bond that eventually develops is rigid and does not allow the paper laminate to expand or contract on the horizontal or vertical surface with changes in temperature with the result that the bond is destroyed or the laminate buckles.

Most of the thermoplastic resin-based adhesives now available are dissolved in high boiling solvents which go off very slowly. This increases installation costs since these solvents must evaporate before sufficient bond strength is developed to support a sheet of laminate. The thermoplastic base is not elastic enough to allow the necessary expansion or contraction of the low-pressure paper laminate. Furthermore, these adhesives require a two-coat application, i. e., one on the back of the laminate and the other on the surface which is to be covered therewith and both coats of the adhesive must be allowed to reach a proper degree of tack before application of the laminate to the backing. This greatly slows up installation of the laminate. For these reasons this type of adhesive is not satisfactory.

Rubber-like elastomer-based adhesives are of the curing type and therefore they cannot be reactivated by solvent or heat after they have once been allowed to set. They are also subject to oxidation and subsequent hardening or embrittlement of the bond. These adhesives are made up with high boiling point solvents and also are usually two-coat adhesives, requiring long waiting periods before enough solvent has left the adhesive to give it enough tack to hold the panel to the wall. Furthermore, when the adhesive is sufficiently tacky, the panel cannot be slid around on the wall or table or the like; the working life of these adhesives is very short and this makes installation very difficult.

The asphalt-based adhesives such as the common linoleum cements have very ample working life but the bond becomes brittle after a few weeks and the adhesion between the rigid low-pressure laminate and the brittle cement is poor. The bond resulting from use of these cements is adversely affected by moisture which is a definite disadvantage in low-pressure paper laminate installations.

Thus it will be seen that there has been no satisfactory adhesive on the market for adhering low-pressure laminates successfully.

The principal object of the present invention is to provide an adhesive composition which overcomes the objections to the adhesives heretofore available for use in securing low-pressure laminates to surfaces to be covered therewith. Another object is to provide such an adhesive composition made up with a solvent that is non-toxic and having a boiling range such as to provide rapid evaporation under ordinary conditions, thereby permitting development of sufficient initial tack of the adhesive to support the panel in place, the solvent remaining at this point being sufficient in amount that the panel may be moved or shifted or removed at the time of installation but insufficient in amount to cause blistering or loose edges.

Another object is to provide an adhesive composition having very low moisture-vapor transmission rendering it excellent for use in damp locations where a moisture-resistant adhesive is required.

Another object is to provide an adhesive composition of the foregoing type which is based upon chemically stable or saturated materials so that there is no embrittlement upon aging as is the case with most types of curing adhesives.

Another object is to provide an adhesive composition which ultimately produces a bond having a higher shear and tensile strength than the low pressure laminate itself and which at the same time is elastic enough to allow slight movement caused by expansion or contraction of the laminate or of the surface to which it is adhered, without separation or buckling of the laminate.

Another object is to provide an adhesive which enables the necessary intimate contact between the laminate and the surface over which it is applied to be obtained by that pressure which can be exerted manually without tiring the workman unduly; the adhesive of our invention does not require mechanical presses for successful adhesion.

Another object is to provide an adhesive composition accomplishing the foregoing objects and which can be applied at the time of manufacture, i. e., in the factory in which the low pressure laminate is produced; the dried precoated sheet needs merely to be freshened with a solvent for the adhesive in the manner described below in order to cause it to adhere to porous or non-porous surfaces. The dried adhesive coated sheet is non-tacky and may be easily handled and stored.

Another object is to provide as a new article of manufacture a preformed sheet of the adhesive composition of our invention which is adapted to be activated by a solvent and then placed between surfaces to be adhered together, e. g., a polyester laminate and the surface to be covered therewith, or to be placed between the surfaces to be adhered and then activated by heat.

Still another object is to provide a new pressure-sensitive adhesive.

Numerous other objects of the present invention will more fully hereinafter appear.

In the accompanying drawing;

Fig. 1 portrays diagrammatically a polyester resin laminate provided on one face with a coating of the adhesive composition of our invention;

Fig. 2 shows the laminate secured to a backing material by means of the composition of the present invention; and Fig. 3 shows a sheet or strip of the dry adhesive composition of our invention.

We have discovered that a composition of matter comprising a thermoplastic copolymer of styrene and isobutylene, a pentaerythritol ester of rosin and an ester of hydrogenated rosin selected from the group consisting of ethylene glycol, diethylene glycol, triethylene glycol and glycerin esters of hydrogenated rosin is a superior adhesive, particularly for adhering a laminate formed of laminations of fibrous material such as paper or fabric impregnated and bonded together with the resinous polymerization product of a mixture of a compound having a single terminal ethylenic group $CH_2=C<$ with an unsaturated alkyd resin which is the reaction product of an ethylenic-alpha-beta dicarboxylic acid with a glycol, typically the resinous material resulting from polymerization of a mixture of styrene and a polyethylene glycol maleate, to a backing material to be covered with such laminate.

The major component of the adhesive composition of our invention is the thermoplastic copolymer of styrene and isobutylene. Such copolymers of styrene and isobutylene are old per se being shown for example in Smyers 2,274,749 and in Official Digest #240, pages 511–516 (November 1944). The ratio of combined styrene to isobutylene in the copolymer employed in the present invention may range from 40:60 to 60:40. We prefer to employ a copolymer in which the ratio of styrene to isobutylene ranges from 45:55 to 55:45. Often the copolymer employed is composed of approximately 50% styrene and approximately 50% isobutylene. As the amount of styrene combined in the copolymer employed is increased above 50%, a harder copolymer is produced. Thus the Shore A Durometer hardness of a copolymer containing 50% styrene ranges from 50 to 63 while that of a copolymer containing 60% styrene ranges from 80 to 90. When the latter copolymer is used in making our adhesive, the bond which is obtained upon solvent evaporation tends to be brittle and for this reason we prefer to use copolymers containing not over 55% of combined styrene.

The intrinsic viscosity of the copolymer of styrene and isobutylene employed in our adhesive composition may range from 0.7 to 0.9, a range of from 0.7 to 0.8 being preferred.

The styrene-isobutylene copolymer used in practicing our invention has a relatively low heat softening point, typically from 45 to 55° C. In practicing our invention this softening point is raised by adding the pentaerythritol ester of rosin thereto. The addition of the pentaerythritol ester of rosin raises the softening point of the adhesive of our invention to at least 110° C. and preferably the pentaerythritol ester of rosin has a melting point such and is added in such amount that the melting point of the adhesive is raised to at least 180° C., typically to approximately 190° C. By softening point we mean the temperature at which the adhesive bond fails when a hot vessel is placed upon it, thereby simulating actual conditions of use of a table top for example. The pentaerythritol ester of rosin performs other functions. Thus it tends to harden the adhesive coating and it does not detract from the excellent aging qualities of the styrene-isobutylene resin since the pentaerythritol ester of rosin has excellent oxidation and heat resistance.

The pentaerythritol ester of rosin may be an ester of ordinary pentaerythritol or a polypentaerythritol or both with a rosin acid, usually ordinary rosin, (i. e., wood rosin or gum rosin), although other rosin acids such as modified rosins, for example, disproportionated rosin, hydrogenated rosin, polymerized rosin, etc., may be used. I may use the simple pentaerythritol ester of ordinary rosin disclosed in the patent to Bent et al. 1,820,265 or I may use modified pentaerythritol esters of rosin such as those which are chemically modified with other materials, usually introduced during their manufacture, which do not destroy their identity as pentaerythritol esters of rosin but which improve them for many purposes. Examples are phenolic-modified pentaerythritol esters of rosin, maleic anhydride-modified pentaerythritol esters of rosin such as are disclosed in patents to Oswald 2,322,197 and Anderson 2,344,194, etc. Instead of maleic anhydride other alpha-beta unsaturated polycarboxylic acids such as fumaric acid, itaconic acid, etc. may be used; the amount used usually is equivalent to an amount of maleic anhydride from 1 to 9% by weight of the rosin acid, as disclosed in the Oswald and Anderson patents. The acid groups of the rosin acid and of any acidic modifying material should be substantially completely esterified; the acid number of the pentaerythritol ester of rosin should be low, preferably not over 50 and almost invariably not over 25.

Examples of commercially available pentaerythritol esters of rosin which can be used in the practice are:

Pentalyn A (unmodified ester of ordinary rosin)
Pentalyn 802A (phenolic-modified ester of ordinary rosin)
Pentalyn X (maleic anhydride-modified ester of ordinary rosin)
Pentalyn C (unmodified ester of polymerized rosin)
Pentalyn F (phenolic-modified ester of ordinary rosin)
Pentalyn H (unmodified ester of hydrogenated rosin)
Pentalyn M (phenolic modified esters of ordinary rosin)
Pentalyn O (maleic-modified ester of ordinary rosin)

All of these are available commercially from Hercules Powder Company. The pentaerythritol ester of rosin employed in practicing our invention, is completely compatible with the other ingredients of our composition and, as indicated above, should have a melting point sufficiently high to raise the softening point of the solvent-free adhesive to at least 110° C. and preferably to at least 150° C.

The amount of the pentaerythritol ester of rosin employed generally ranges from 1 to 35 parts per 100 parts of styrene-isobutylene copolymer, a range of from 5 to 25 parts being preferred.

The third essential ingredient of the composition of our invention is the glycerin or glycol ester of hydrogenated rosin. It should have a low acid number, preferably not over 50 and usually less than 25. Examples of esters of hydrogenated rosin which are suitable are: an ethyleneglycol ester of hydrogenated rosin in the form of a tacky, plastic resin having a sp. gr. of 1.06, a melting point of 131° F., an acid number of 12 or less, a flash point of 471° F., and a refractive index of 1.528 at 20° C.; a diethylene glycol ester of hydrogenated rosin in the form of a soft, balsam-type resin having a sp. gr. of 1.05, a melting point of 104° F., an acid number of 10 or less, a flash point of 476° F., and a refractive index of 1.523 at 20° C.; a triethylene glycol ester of hydrogenated rosin in the form of a viscous liquid having a sp. gr. of 1.088, a flash point of 439° F., an acid number of 10 or less and a refractive index of 1.518 at 20° C.; a glycerin ester of hydrogenated rosin in the form of a hard, brittle solid having a sp. gr. of 1.08, a melting point of 183° F., an acid number of 10 or less and a refractive index of 1.532 at 20° C. These esters are available commercially from Hercules Powder Company under the names of Staybelite Esters Nos. 1, 2, 3 and 10, respectively. These esters of hydrogenated rosin serve to impart to the adhesive increased tackiness which is very necessary in any adhesive designed for holding in place rather stiff materials, like the above-mentioned polyester resin laminate, which tend to curl shortly after the adhesive is activated.

The amount of the glycerin or glycol ester of hydrogenated rosin employed will generally range from 1 to 35 parts per 100 parts of styrene-isobutylene copolymer, a range of from 5 to 25 parts per 100 parts of said copolymer being preferred.

It is often preferred to use approximately equal parts of the pentaerythritol ester of rosin and the glycerin or glycol ester of hydrogenated rosin in the formulation.

If desired, the softening point of the adhesive may be still further raised by adding polydichlorostyrene resin thereto, for example poly-2,5-dichlorostyrene resin having a softening point of from 212° F. to 230° F. The amount of such polydichlorostyrene resin employed may range up to 30 parts per 100 parts of the styrene-isobutylene copolymer, a range of from 10 to 30 parts thereof per 100 parts of said copolymer often being preferred. The use of 20 parts is recommended for optimum processing and results.

The unique adhesive composition of our invention has excellent aging properties, is thermoplastic and yet has a high enough softening point so that in ordinary usage the bond does not fail. It is easily activated with most organic solvents, giving an initial tack sufficient to hold a stiff sheet of resin impregnated laminate to a vertical surface.

The adhesive composition of our invention may be used in many ways. We often dissolve the foregoing materials in a suitable volatile organic solvent to a suitable solids content and apply the resulting solution to one of the two surfaces to be adhered together whereupon after the initial solvent flash-off, the coating becomes tacky to the touch and the two surfaces are ready to be joined together. While any solvent may be used we prefer to use an essentially paraffinic volatile petroleum hydrocarbon solvent which upon evaporation leaves no gummy or asphaltic residues. We have obtained excellent results using such a petroleum solvent fraction having a specific gravity of from 0.705 to 0.720 at 60° F. and a boiling range of from 130 to 270° F. The solids content of the adhesive cement made in this manner may vary from 10 to 45%, 35% being preferred when the adhesive is used for coating a surface to give a film which will be dried and subsequently activated by treatment with a suitable solvent prior to use. More dilute solutions of the composition of our invention in such volatile organic solvents, i. e., more dilute than 10% solids, may be used as a sizing for porous surfaces since the material will seal the surface with a film having very low moisture vapor permeability.

The higher solids material, i. e. the solutions containing from 10 to 45% of solids, is spread over the surface to be covered, by any of the standard coating means, and is then dried, for example at a temperature of about 150° F. The resulting dried coating may then be subsequently activated with any aromatic or aliphatic hydrocarbon or halogenated hydrocarbon or ketone or with any other solvent for the adhesive coating. The same hydrocarbon solvent which was used for dissolving the materials to form the adhesive cement is recommended as the activating liquid. After treating the dried surface with a solvent and allowing the initial solvent flash-off, the adhesive coating becomes tacky to the touch and then the adhesive-coated sheet is ready to apply. Instead of solvent activation, activation may be effected by simultaneous application of moderate heat and pressure.

Alternatively, the solvent-free resinous material described above may be mixed on a mill such as a two-roll mill of the type used for compounding rubber or in a Banbury mixer after which the resulting material may be sheeted out, for example on a calender, and used as an organic solder. Thus a strip of the sheet material may be cut and placed between the two materials which are to be adhered whereupon heat and very moderate pressure may be applied to produce adhesion. Alternatively such sheet-like material may be used to adhere other materials by solvent activation. For example, both sides of the sheet of dry adhesive may be treated with a solvent, such as a petroleum solvent of the type mentioned above, initial solvent flash-off allowed to occur whereupon the surfaces of the adhesive sheet become tacky, at which time the sheet is placed between the two surfaces to be joined and moderate pressure is applied, usually manually, whereupon the bond is completed.

The adhesive composition of our invention is particularly adapted for adhering polyester resin laminate or other materials having a surface of the resinous polymerization product of a mixture of a compound having a single terminal ethylenic group $CH_2=C<$, such as styrene, with an unsaturated alkyd resin which is the reaction product of an ethylenic-alpha-beta dicarboxylic acid with a glycol, e. g. polyethylene glycol maleate. Surfaces of such resinous materials are extremely difficult to adhere by means of previously available adhesives for reasons detailed above. Our invention is particularly applicable to adhering laminate formed of laminations of fibrous material such as paper or cloth impregnated and bonded with such a resinous polymerization product. The method of making such laminates is well known and need not be described in detail, it being sufficient to state that they are usually made by plying up layers of cloth or paper which have been saturated or impregnated with the copolymerizable mixture described above followed by polymerization in situ of the copolymerizable mixture to a resinous product. Such laminates are described in detail in Hicks "Low-pressure Laminating of Plastics", Reinhold, 1947.

We have further found that an excellent pressure-sensitive adhesive may be made by incorporating diethylene glycol caprylate with the styrene-isobutylene copolymer, the pentaerythritol ester of rosin and the ethylene glycol, diethylene glycol, triethylene glycol or glycerin ester of hydrogenated rosin. The diethylene glycol caprylate functions as a plasticizer and confers remarkable pressure-sensitive properties upon the mixture.

The pressure-sensitive adhesive composition of our invention is usually prepared by forming a solution of the styrene-isobutylene copolymer, the pentaerythritol ester of rosin and the glycol or glycerin ester of hydrogenated rosin, in the relative proportions given above, in a suitable volatile organic solvent and incorporating therewith the diethylene glycol caprylate. We prefer to employ the diethylene glycol caprylate in an amount ranging from 5 to 15 parts per 100 parts of the styrene-isobutylene copolymer, the proportions of the other ingredients preferably being within the limits given above. Use of less than 5 parts diethylene glycol caprylate does not produce the desired pressure-sensitive effect and use of more than 15 parts results in excessive stickiness.

Upon applying the solution obtained to a surface to be rendered permanently tacky and pressure-sensitive and allowing the organic solvent to evaporate, an unusually satisfactory pressure-sensitive, permanently tacky film is obtained. By application to a suitable backing such as paper or a transparent unsupported film, for example, of regenerated cellulose or vinyl resin or the like, there is obtained a pressure-sensitive material. If the backing is a tape, a pressure-sensitive tape is obtained.

This pressure-sensitive composition is unusually satisfactory for adhering unsupported vinyl resin films to other surfaces; it is exceedingly difficult to effect adhesion of such vinyl resin surfaces with previously known adhesives.

The pressure-sensitive adhesive composition is extremely tenacious and gives an unusually high degree of adhesion.

An advantage of using our pressure-sensitive adhesive composition is that it is unnecessary to first prime the backing material before applying it. The adhesion of our composition to such backings as regenerated cellulose, vinyl resin films and similar transparent films is excellent without such priming.

In the drawing

Fig. 1 shows a polyester resin laminate having three plies 1 coated with a layer 2 of the adhesive composition of our invention.

In Fig. 2 the adhesion of such a laminate to a backing 3 by means of adhesive layer 2 is portrayed.

Fig. 3 shows a dry or solvent-free sheet 2 of the adhesive composition of our invention.

The following examples illustrate our invention in more detail. The styrene-isobutylene copolymer used in these examples contained approximately 50% styrene and approximately 50% isobutylene and had an intrinsic viscosity of 0.75. The petroleum solvent used in the examples was an essentially paraffinic hydrocarbon fraction which upon evaporation left no gummy or asphaltic residues, which had a specific gravity of from 0.705 to 0.720 at 60° F. and which had a boiling range of from 130 to 270° F. The pentaerythritol ester of rosin used in Examples 1 to 5 and 14 to 18 was that available commercially from Hercules Powder Company as "Pentalyn G" which is a maleic anhydride-modified pentaerythritol ester of wood rosin and is a hard, brittle solid with a color grade of from M to WG, a specific gravity of 1.08, a melting point of 273° F. and an acid number of 16 or less. The glycerin ester of hydrogenated rosin used in Examples 1 to 14 and 18 was that sold commercially by Hercules Powder Company as Staybelite Ester No. 10 the properties of which are detailed above. The numbers designate parts by weight.

EXAMPLE 1.—TYPICAL ADHESIVE ESPECIALLY USEFUL FOR ADHERING LOW PRESSURE LAMINATES TO SURFACES

*Formula*

| Dry | | Wet |
|---|---|---|
|  | Petroleum Solvent | 223 |
| 10 | Pentaerythritol Rosin Ester | 10 |
| 10 | Glycerin Ester of Hydrogenated Rosin | 10 |
| 100 | Styrene-Isobutylene Copolymer | 100 |
| 120 | | 343 |

The pentaerythritol rosin ester and the glycerin ester of hydrogenated rosin were added to the petroleum solvent and the mixture stirred vigorously until the esters went into solution. The styrene-isobutylene copolymer was then added to the resulting mixture and stirring was continued until complete solution was effected. The resulting composition had the following physical properties:

*a. Storage life of solvent-based adhesive used in spreading operations.*

The solvent dispersed adhesive composition of Example 1 has an indefinite storage life, dependent upon the vapor seal of the container necessary to prevent evaporation of solvent. If the solvent evaporates, it is possible simply to add more solvent and redisperse the adhesive composition.

*b. Activation life of dried precoated adhesive*

Tests show that at up to 6 months room temperature aging (70–100° F.), the above-described composition shows no deterioration. Activation time, initial tack and bond strength are all unimpaired. There is no deterioration of the bonding qualities with the passage of time since the adhesive is stable, being essentially chemically saturated.

*c. Bond strength when used for adhering low pressure polyester resin laminates to surfaces of wood, metal or like*

Room temperature aging (80° F.) for 10 months has caused no bond weakening when the adhesive of Example 1 was used to bond several polyester resin impregnated sheets to plywood, Masonite (exploded wood fibre board) or metal. The bond obtained is stronger than the tensile strength of the low pressure laminate, the bond strength being in excess of 180#/in².

*Accelerated aging.*—Tests on the adhesive of Example 1, based on the development of bond strength from solvent evaporation, show that one day in the Geer oven at 158° F. is equivalent to about 8 days at room temperature. After 2256 hours at 158° F. (roughly equivalent to 2 years at room temperature) the bond had excellent shear strength, and a tensile of over 220#/in². At this point the low pressure laminate failed. This was tested in adhering the low pressure laminate to plywood, Masonite and metal.

*Weatherometer aging.*—This test, which is recognized in the adhesives industry, involves exposure in ultraviolet light at 120° F., the sample being sprayed intermittently with water. The adhesive of Example 1 when used to adhere a low pressure laminate to plywood had no bond deterioration after 145 hours. At this point, the wood plies making up the plywood had separated.

EXAMPLE 2

Example 1 was duplicated except that the dry ingredients were first mixed together on a rubber mill and then dissolved in the solvent. The styrene-isobutylene copolymer was banded on a hot mill whereupon the rosin esters which had been previously broken down were added thereto. The ingredients were milled until homogeneous, the time required being about 20 minutes. The composition obtained dissolved readily in the petroleum solvent. The adhesive obtained had properties identical with those of the adhesive of Example 1.

EXAMPLE 3.—TYPICAL ADHESIVE ESPECIALLY USEFUL FOR ADHERING METAL TO PORCELAIN OR OTHER NON-POROUS SURFACES

| Dry | | Wet |
|---|---|---|
|  | Petroleum Solvent | 325 |
| 25 | Pentaerythritol Rosin Ester | 25 |
| 25 | Glycerin Ester of Hydrogenated Rosin | 25 |
| 100 | Styrene-Isobutylene Copolymer | 100 |
| 150 | | 475 |

These ingredients were mixed in the manner shown in Example 2.

EXAMPLE 4.—TYPICAL DRY SHEET ADHESIVE FORMULA FOR SECURING METAL TO METAL OR METAL TO PORCELAIN

| | Dry pts. |
|---|---|
| Polydichloro styrene resin (softening point 212–230° F.) | 20.0 |
| Styrene-isobutylene copolymer | 100.0 |
| Pentaerythritol rosin ester | 10.0 |
| Glycerin ester of hydrogenated rosin | 10.0 |
| | 140.0 |

The polydichlorostyrene resin was banded on a hot (340° F.) mill whereupon the styrene-isobutylene copolymer was added and milled therewith. After these had been intimately mixed, the mill was cooled whereupon the pentaerythritol ester of rosin and the glycerin ester of hydrogenated rosin were mixed intimately with the resulting mixture and the final mixture was sheeted out giving a sheet of adhesive.

EXAMPLES 5 TO 17

Example 2 was duplicated except that in Examples 6 to 13 the Pentalyn G was replaced with other pentaerythritol esters of rosin identified above and in Examples 15 to 17 the glycerin ester of hydrogenated rosin (Staybelite Ester No. 10) was replaced with the ethylene glycol, diethylene glycol and triethylene glycol esters respectively. The adhesives obtained were used to bond a polyester resin laminate to plywood. The tensile and shear strengths of the ultimate bond obtained after 20 days in the Geer oven at 158° F. were measured. Based upon the data obtained, the adhesives of Examples 6 to 13 and 15 to 17 were not appreciably different from those of Examples 5 and 14, which were made with Pentalyn G and Staybelite Ester #10. The data follows:

| Example | Replacement of Pentalyn G with— | Tensile #1/in.² | Shear Strength |
|---|---|---|---|
| 5 | Standard (Blank #1) | ¹143 | Good. |
| 6 | Pentalyn A | ¹153 | Do. |
| 7 | Pentalyn 802A | ¹125 | Do. |
| 8 | Pentalyn X | ¹125 | Do. |
| 9 | Pentalyn C | ²148 | Do. |
| 10 | Pentalyn F | ²150 | Do. |
| 11 | Pentalyn H | 225 | Do. |
| 12 | Pentalyn M | ¹125 | Do. |
| 13 | Pentalyn O | ¹168 | Do. |
|  | Replacement of Staybelite Ester #10 with— |  |  |
| 14 | Standard (Blank #1) | ¹162 | Good. |
| 15 | Staybelite Ester #1 | ¹130 | Do. |
| 16 | Staybelite Ester #2 | ¹140 | Do. |
| 17 | Staybelite Ester #3 | ¹152 | Do. |

¹ Means that polyester resin laminate failed before the bond failed.
² Means that the plywood failed before the bond failed.

EXAMPLE 18.—PRESSURE-SENSITIVE ADHESIVE COMPOSITION

|  | Parts |
|---|---|
| Petroleum solvent | 223 |
| Pentaerythritol ester of rosin | 10 |
| Glycerin ester of hydrogenated rosin | 10 |
| Styrene-isobutylene copolymer | 100 |
| Diethylene glycol caprylate | 10 |

The pentaerythritol rosin ester, glycerin ester of hydrogenated rosin and styrene-isobutylene copolymer were milled together in the manner of Example 2 and then dissolved in the solvent. After solution had been effected, the diethylene glycol caprylate was dissolved in the mixture obtained. The resulting composition was applied to a surface which it was desired to render pressure-sensitive after which the solvent was allowed to evaporate. A very satisfactory pressure-sensitive film was obtained.

From the foregoing description many advantages from the present invention will be apparent to those skilled in the art. It will be seen that the present invention provides an adhesive composition and structure which makes readily possible the accomplishment of the aims and objects set out above. It will be seen that the present invention is particularly advantageous in that it makes possible the adhesion in a simple and economical manner of polyester resin laminates the adhesion of which has presented a particularly difficult problem in the past. The lack of a suitable adhesive for such laminates has greatly hindered the extensive utilization of such polyester resin laminates. It will further be seen that the adhesive composition of the present invention has an indefinite storage life and an indefinite activation life and that the resulting bond does not deteriorate with the passage of time even under severe aging conditions. Another advantage of the present invention is that it provides a new and novel thermoplastic adhesive having rubbery qualities which adapt it to use as a coating on the back of various materials such as laminates, rubber and vinyl flooring, wood, metal and other surfaces to give a product which may be stored without deterioration of the adhesive until used, i. e., activated and adhered to some surface. The new adhesive of our invention has excellent aging qualities, unlike the usual curing rubber adhesives. It does not require high pressure for bonding as do the phenol-, urea- or resorcinol-aldehyde types of thermosetting adhesives. It is flexible enough to permit relative movement of the adhered surfaces due to expansion and contraction without loosening from either surface. After the initial solvent flash time following either application of a solution of the adhesive or activation of a surface of the adhesive, the adhesive is ready for immediate use and has very high tack immediately sufficient for holding heavy laminates in a vertical position. The adhesive of our invention may be activated with solvent or with heat. Thus it is adapted to use in a wide variety of applications under a wide variety of conditions. Another advantage is that our invention provides a dry sheet adhesive based on ingredients which are the same as the solvent-dispersed adhesive. The resulting dry sheet may be used for bonding metal to metal or other porous or nonporous surfaces.

Another advantage is that our invention makes available an unusually satisfactory pressure-sensitive adhesive. Numerous other advantages of our invention will be immediately apparent to those skilled in the art.

All parts and percentages referred to herein are by weight.

Having thus described our invention, what we claim and desire to protect by Letters Patent is:

1. A composition of matter having adhesive properties and comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

2. A composition of matter having adhesive properties and comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 5 to 25 parts per 100 parts of said thermoplastic copolymer of styrene and isobutylene and the amount of said ester of hydrogenated rosin ranging from 5 to 25 parts per 100 parts of said thermoplastic copolymer of styrene and isobutylene.

3. A composition of matter having adhesive properties and comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, an ester of hydrogenated rosin selected from the group consisting of ethylene glycol, diethylene glycol and glycerin esters of hydrogenated rosin, the amount of said pentaerythritol ester ranging from 5 to 25 parts per 100 parts of said thermoplastic copolymer of styrene and isobutylene and the amount of said ester of hydrogenated rosin ranging from 5 to 25 parts per 100 parts of said thermoplastic copolymer of styrene and isobutylene, said copolymer and said esters being dissolved in a volatile essentially paraffinic petroleum hydrocarbon solvent to form a solution containing from 10 to 45 per cent solids.

4. A composition of matter having adhesive properties and comprising a solvent-free mixture of a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

5. A dry sheet adhesive comprising a sheeted solvent-free mixture of a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

6. A composition of matter having adhesive properties and comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, an ester of hydrogenated rosin selected from the group consisting of ethylene glycol, diethylene glycol, triethylene glycol and glycerin esters of hydrogenated rosin and a resinous polymer of dichlorostyrene, the amount of said pentaerythritol ester ranging from 1 to 35 parts per 100 parts of said thermoplastic copolymer of styrene and isobutylene, the amount of said ester of hydrogenated rosin ranging from 1 to 35 parts per 100 parts of said thermoplastic copolymer of styrene and isobutylene, and the amount of said resinous polymer of dichlorostyrene ranging from 10 to 30 parts per 100 parts of said thermoplastic copolymer of styrene and isobutylene.

7. In combination, a material having a surface of the polymerization product of a mixture of a compound having a single terminal ethylenic group $CH_2=C<$ with an unsaturated alkyd resin which is the reaction product of an ethylenic-alpha-beta dicarboxylic acid with a glycol, and, in intimate association with said surface, a layer of an adhesive composition of matter comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

8. In combination, a laminate formed of laminations of fibrous material impregnated and bonded together with a resinous polymerization product of a mixture of a compound having a single terminal ethylenic group $CH_2=C<$ with an unsaturated alkyd resin which is the reaction product of an ethylenic-alpha-beta dicarboxylic acid with a glycol, and, in intimate association with the resinous surface of said laminate, a layer of an adhesive composition of matter comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

9. In combination, a laminate formed of laminations of fibrous material impregnated and bonded together with the resinous polymerization product of a mixture of styrene and a polyethylene glycol maleate, and, in intimate association with the resinous surface of said laminate, a layer of an adhesive composition of matter comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said phentaerythritol esters being substantially completely esterified, and an ester of hydrogenated rosin selected from the group consisting of ethylene glycol, diethylene glycol, triethylene glycol and glycerin esters of hydrogenated rosin, the amount of said penaterythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

10. In combination, a backing material and, secured to said backing material, a material having a surface of the resinous polymerization product of a mixture of a compound having a single terminal ethylenic group $CH_2=C<$ with an unsaturated alkyd resin which is the reaction product of an ethylenic-alpha-beta dicarboxylic acid with a glycol, said last-named material being secured to said backing material by an intermediate layer of an adhesive composition comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

11. In combination, a backing material and, secured to said backing material, a laminate formed of laminations of fibrous material impregnated and bonded together with the resinous polymerization product of a mixture of a compound having a single terminal ethylenic group $CH_2=C<$ with an unsaturated alkyd resin which is the reaction product of an ethylenic-alpha-beta dicarboxylic acid with a glycol, said laminate being secured to said backing material by an intermediate layer of an adhesive composition comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 1 to 35 parts per 100 parts of said thermoplastic copolymer of styrene and isobutylene and the amount of said ester of hydrogenated rosin ranging from 1 to 35 parts per 100 parts of said thermoplastic copolymer of styrene and isobutylene.

12. In combination, a backing material and, secured to said backing material, a laminate formed of laminations of fibrous material impregnated and bonded together with the resinous polymerization product of a mixture of styrene and a polyethylene glycol maleate, said laminate being secured to said backing material by an intermediate layer of an adhesive composition comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, and an ester of hydrogenated rosin selected from the group consisting of ethylene glycol, diethylene glycol, triethylene glycol and glycerin esters of hydrogenated rosin, the amount of said pentaerythritol ester ranging from 5 to 25 parts per 100 parts of said thermoplastic copolymer of styrene and isobutylene and the amount of said ester of hydrogenated rosin ranging from 5 to 25 parts per 100 parts of said thermoplastic copolymer of styrene and isobutylene.

13. A composition forming a normally tacky pressure-sensitive adhesive comprising a thermoplastic copolymer of styrene and isobutylene in a ratio ranging from 40 parts of styrene to 60 parts of isobutylene to 60 parts of styrene to 40 parts of isobutylene, a pentaerythritol ester selected from the group consisting of the pentaerythritol and polypentaerythritol esters of rosin acids and phenolic-modified and alpha-beta unsaturated polycarboxylic acid-modified esters of rosin acids, said pentaerythritol esters being substantially completely esterified, an ester of hydrogenated rosin from the group consisting of ethylene glycol, diethylene glycol, triethylene glycol and glycerin esters of hydrogenated rosin, and diethylene glycol caprylate, the amount of said pentaerythritol ester ranging from 1 to 35 parts per 100 parts of said thermoplastic copolymer of styrene and isobutylene, the amount of said ester of hydrogenated rosin ranging from 1 to 35 parts per 100 parts of said thermoplastic copolymer of styrene and isobutylene, and the amount of said diethylene glycol caprylate ranging from 5 to 15 parts per 100 parts of said thermoplastic copolymer of styrene and isobutylene.

14. The composition of claim 13 wherein the relative proportions of said ingredients range from 5 to 25 parts of said pentaerythritol ester, from 5 to 25 parts of said ester of hydrogenated rosin and from 5 to 15 parts of said diethylene glycol caprylate per 100 parts of said copolymer of styrene and isobutylene.

15. A composition forming a normally tacky pressure-sensitive adhesive comprising 100 parts of a thermoplastic copolymer of styrene and isobutylene in a ratio ranging from 40 parts of styrene to 60 parts of isobutylene to 60 parts of styrene to 40 parts of isobutylene, 10 parts of maleic anhydride-modified pentaerythritol ester of rosin, 10 parts of glycerin ester of hydrogenated rosin and 10 parts of diethylene glycol caprylate.

EDWARD C. VAN BUSKIRK.
DAVID D. M. STREED.
JAMES H. FLOOD.

REFERENCES CITED

The following references are of record in the file of this patent:

UNITED STATES PATENTS

| Number | Name | Date |
|---|---|---|
| 2,142,039 | Abrams et al. | Dec. 27, 1938 |
| 2,213,423 | Gaylor | Sept. 3, 1940 |
| 2,274,749 | Smyers | Mar. 3, 1942 |